Nov. 24, 1936.  K. C. MONROE  2,061,949
DEVICE TO ABSORB PRESSURE FLUCTUATIONS
Filed Dec. 9, 1935
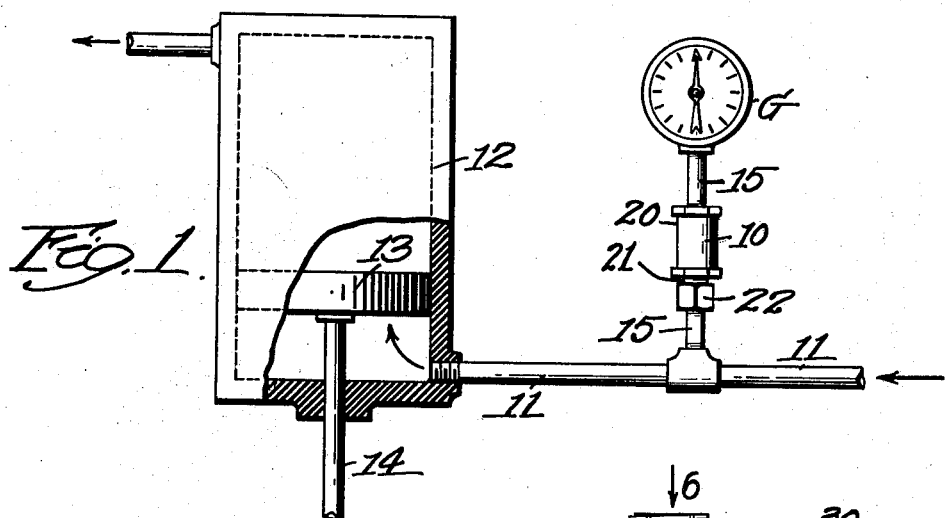
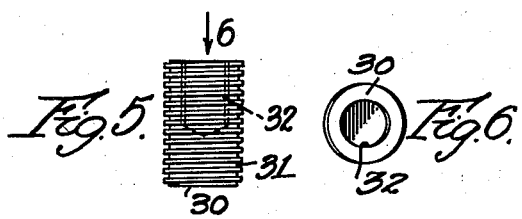
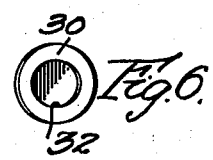
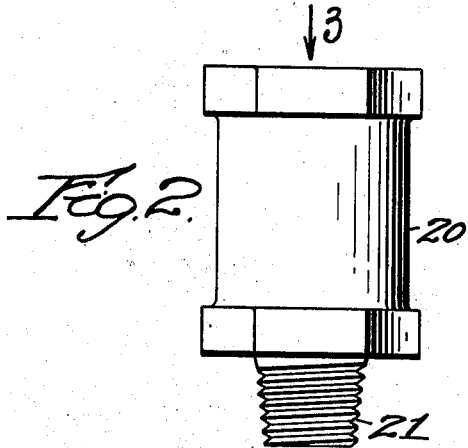
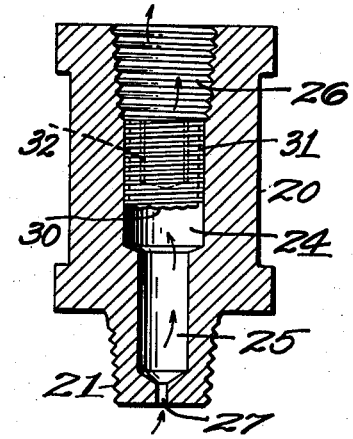
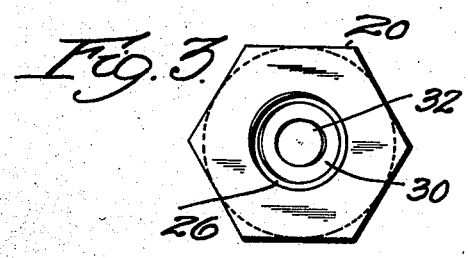
Inventor
Kenneth C. Monroe Patented Nov. 24, 1936

2,061,949

UNITED STATES PATENT OFFICE 2,061,949

DEVICE TO ABSORB PRESSURE FLUCTUATIONS

Kenneth C. Monroe, Hudson, Mass., assignor to The Lapointe Machine Tool Company, Hudson, Mass., a corporation of Maine Application December 9, 1935, Serial No. 53,460

2 Claims. (Cl. 138—42)

This invention relates to a device for absorbing temporary pressure variations or fluctuations in a gauge connection or other connection of a hydraulic system. The invention is capable of general application but is more particularly designed for protecting a pressure gauge from pressure fluctuations in a hydraulic broaching machine or other machine tool.

In many such machine tools, the load on the ram is subject to frequent and substantial pressure variations during the working stroke. Such variations or fluctuations are particularly characteristic of high speed hydraulic broaching machines, in which increases and decreases of pressure follow each other rapidly as the teeth of the broach enter and leave the work or encounter marked differences in tool resistance.

When a pressure gauge of the usual commercial type is attached to a hydraulic system subject to such rapid and substantial fluctuations in pressure, the pointer of the gauge will vibrate to such an extent that no accurate pressure reading can be taken. Furthermore, the more delicate parts of the gauge are frequently damaged or become quickly worn out by these frequent pressure variations, and the pressure indications of the gauge become correspondingly inaccurate.

It is the general object of my invention to provide an improved device for absorbing such pressure variations in a gauge connection or other connection, so that a resultant average pressure only will act on the gauge and will be indicated thereby.

My invention further relates to arrangements and combinations of parts which will be hereinafter described and more particularly pointed out in the appended claims.

A preferred form of the invention is shown in the drawing, in which

Fig. 1 is a front elevation, partly in section, showing my invention embodied in the gauge connection of a hydraulic system;

Fig. 2 is a front elevation of my improved device for absorbing pressure variations;

Fig. 3 is a plan view thereof;

Fig. 4 is a sectional front elevation thereof;

Fig. 5 is a front elevation of a spirally grooved plug to be described, and

Fig. 6 is a plan view of the plug.

Referring to Fig. 1, I have shown my improved device 10 interposed in a branch connection between a pressure gauge G and a supply pipe 11 for a hydraulic cylinder 12 in which a piston 13 is slidable. The piston rod 14 of the piston 13 may be connected to a broach or to any other desired part of a machine tool.

As variations occur in the resistance to movement of the piston 13, the pressure in the lower part of the cylinder 12 will correspondingly increase or decrease and these pressure variations or fluctuations will be communicated to the branch connection 15. Unless some fluctuation-absorbing device is interposed in the branch connection 15, the fluctuations will directly affect the gauge, with the undesirable results above set forth.

For the purpose of absorbing these pressure variations, I interpose the device 10 in the branch connection 15. This device comprises a body 20 having a threaded extension 21 at one end adapted to be connected by a sleeve or coupling 22 to the lower portion of the branch connection 15.

The body 20 is provided with a cylindrical chamber 24, a smaller cylindrical chamber 25 communicating therewith, and an internally threaded upper end portion 26 adapted to receive the upper portion of the branch connection 15 and to be thereby connected to the gauge G. A small opening or orifice 27 in the lower end of the threaded extension 21 communicates with the lower end of the smaller cylindrical chamber 25.

A plug 30 is formed with a spiral groove 31 in its outer cylindrical surface, the effect being substantially that of a fine screw thread of the square or acme type. The plug 30 is also preferably provided with an internal opening 32 for a purpose to be described.

The plug 30 is of such outside diameter that it is a fairly close press fit in the cylindrical chamber 24, which chamber is substantially filled by the plug when the parts are assembled. The threaded opening 32 is provided for the insertion of a drag rod, to be used if it should be desirable to remove the plug from the body 20 after assembly thereof.

When this device is inserted in the branch connection 15 as indicated in Fig. 1, the only communication between the lower and upper parts of the connection 15 will be through the orifice 27, the sediment chamber 25 and the spiral groove 31. As the plug is a close fit to the body 20, there is no cross communication between adjacent grooves and only a through passage along a continuous spiral path from one end to the other of the plug. Consequently the pressure fluctuations must exert themselves through this spiral passage of very small cross section, many inches in length and constantly changing in direction.

It is found by actual experience that this spiral passage is effective in damping and absorbing rapid pressure fluctuations, largely by frictional resistance in the spiral groove and perhaps partly by centrifugal action in said groove. In any event, the pressure fluctuations are effectively absorbed and the gauge G will show a substantially steady average pressure, instead of attempting to record the temporary fluctuations in pressure which actually occur.

It should be noted that this result could not be attained simply by the use of the orifice 27, even if the orifice were made very small, as an orifice is only effective where a substantial flow of liquid takes place, whereas in the type of apparatus herein described, the actual movement of liquid due to these rapid pressure variations or fluctuations is extremely small. In fact, the liquid in the branch connection 15, while subject to substantial pressure variations, is itself substantially static.

Having thus described my invention and the advantages thereof, I do not wish to be limited to the details herein disclosed, otherwise than as set forth in the claims, but what I claim is:—

1. A device to absorb pressure fluctuations comprising a body having a cylindrical chamber, a sediment chamber communicating therewith, a shoulder separating said chambers, an orifice in one end of said body forming an inlet to said sediment chamber, an outlet passage in the opposite end of said body for said cylindrical chamber, and a cylindrical plug fixedly assembled in said cylindrical chamber with a press fit and substantially filling said chamber, said plug being seated against the shoulder between said chambers and having a small continuous fine pitch spiral groove in its peripheral surface forming a passage of relatively great length and restricted cross section extending from said sediment chamber to said outlet passage.

2. A device to absorb pressure fluctuations comprising a body having a cylindrical chamber, a sediment chamber communicating therewith, a shoulder separating said chambers, an orifice in one end of said body forming an inlet to said sediment chamber, an outlet passage in the opposite end of said body for said cylindrical chamber, and a cylindrical plug fixedly assembled in said cylindrical chamber with a press fit and substantially filling said chamber, said plug being seated against the shoulder between said chambers and having a small continuous fine pitch spiral groove in its peripheral surface forming a passage of relatively great length and restricted cross section extending from said sediment chamber to said outlet passage, and said plug having an internally threaded single-ended opening in its outer end to receive a tool by which said plug may be withdrawn from said cylindrical chamber.

KENNETH C. MONROE.